US010331391B2

(12) United States Patent
Sugimoto

(10) Patent No.: US 10,331,391 B2
(45) Date of Patent: Jun. 25, 2019

(54) IMAGE RECORDING APPARATUS

(71) Applicant: Brother Kogyo Kabushiki Kaisha, Nagoya-shi, Aichi-ken (JP)

(72) Inventor: Tasuku Sugimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/927,595

(22) Filed: Mar. 21, 2018

(65) Prior Publication Data
US 2019/0095150 A1 Mar. 28, 2019

(30) Foreign Application Priority Data
Sep. 27, 2017 (JP) .................... 2017-185809

(51) Int. Cl.
*G06F 3/12* (2006.01)
*B41J 13/00* (2006.01)
*B41J 29/38* (2006.01)
*G06K 15/00* (2006.01)

(52) U.S. Cl.
CPC ........ *G06F 3/1238* (2013.01); *B41J 13/0018* (2013.01); *B41J 29/38* (2013.01); *G06F 3/1222* (2013.01); *G06F 3/1274* (2013.01); *G06K 15/4095* (2013.01)

(58) Field of Classification Search
CPC ............... G06F 3/1238; B41J 13/0018
See application file for complete search history.

(56) References Cited

U.S. PATENT DOCUMENTS

| 5,600,596 A * | 2/1997 | Shirakihara | G06F 13/16 365/189.05 |
| 2002/0026289 A1* | 2/2002 | Kuzunuki | G01C 21/34 702/150 |
| 2004/0114173 A1* | 6/2004 | Bunker | G06F 9/4403 358/1.14 |
| 2008/0259399 A1* | 10/2008 | Wada | G06F 3/1204 358/1.15 |
| 2012/0162714 A1* | 6/2012 | Ohhashi | G06F 3/122 358/1.15 |

FOREIGN PATENT DOCUMENTS

| JP | H08-194413 A | 7/1996 |
| JP | 2009-131984 | * 6/2009 |
| JP | 2009-131984 A | 6/2009 |

* cited by examiner

*Primary Examiner* — Ibrahim Siddo
(74) *Attorney, Agent, or Firm* — Banner & Witcoff, Ltd.

(57) ABSTRACT

An image recording apparatus includes a print engine, a sensor, a controller, and a memory. The print engine is configured to record an image on a recording medium. The sensor is configured to detect whether the image recording apparatus is moved. The memory is configured to store particular information. The memory stores instructions, the instructions, when executed by the controller, causing the controller to perform: a first deletion process of, in response to determining that a first condition is satisfied, deleting the particular information stored in the memory, the first condition being that movement of the image recording apparatus is detected by the sensor.

17 Claims, 8 Drawing Sheets

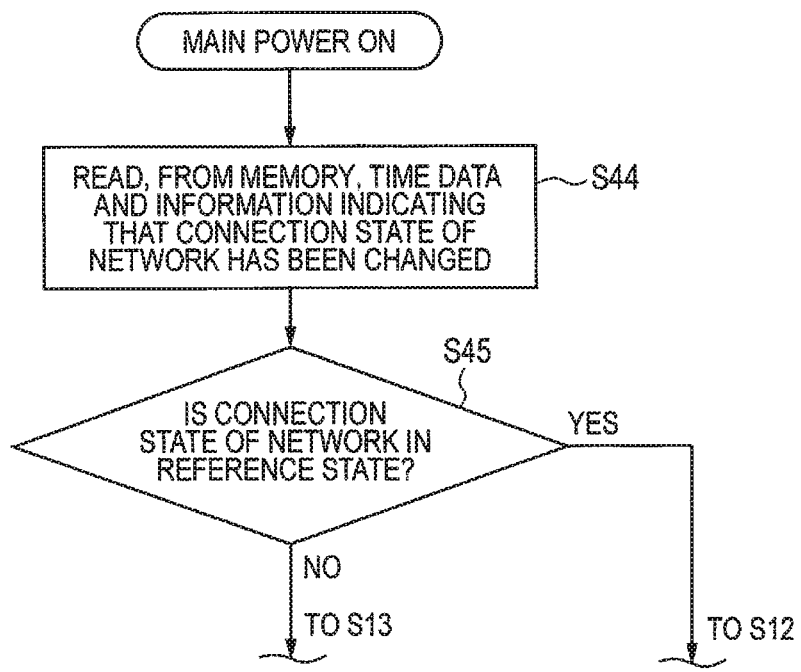

IMAGE RECORDING APPARATUS

CROSS REFERENCE TO RELATED APPLICATIONS

This application claims priority from Japanese Patent Application No. 2017-185809 filed Sep. 27, 2017. The entire content of the priority application is incorporated herein by reference.

TECHNICAL FIELD

This disclosure relates to an image recording apparatus and so on.

BACKGROUND

As one example of an image recording apparatus, there is proposed a technology of preventing illegal use of the image recording apparatus as a result of reselling or theft by detecting relocation of the image recording apparatus, and locking a printing function of the image recording apparatus.

SUMMARY

According to one aspect, this specification discloses an image recording apparatus. The image recording apparatus includes a print engine, a sensor, a controller, and a memory. The print engine is configured to record an image on a recording medium. The sensor is configured to detect whether the image recording apparatus is moved. The memory is configured to store particular information. The memory stores instructions, the instructions, when executed by the controller, causing the controller to perform: a first deletion process of, in response to determining that a first condition is satisfied, deleting the particular information stored in the memory, the first condition being that movement of the image recording apparatus is detected by the sensor.

According to another aspect, this specification discloses an image recording apparatus. The image recording apparatus includes a print engine, a communication interface, a controller, and a memory. The print engine is configured to record an image on a recording medium. The communication interface is configured to be connected to a network. The memory is configured to store particular information. The memory stores instructions, the instructions, when executed by the controller, causing the controller to perform: in response to detecting a change of a connection state of the communication interface to the network, storing, in the memory, information indicating that the connection state of the network changes and time data at which the connection state of the network changes; and in response to determining that a continuation period of change of the connection state of the network exceeds a particular determination period, deleting the particular information stored in the memory.

According to still another aspect, this specification discloses an image forming apparatus. The image forming apparatus includes an image forming device, a sensor, a controller, and a memory. The image forming device is configured to form an image. The sensor is configured to detect whether the image forming apparatus is moved. The memory is configured to store particular information. The memory stores instructions, the instructions, when executed by the controller, causing the controller to perform: a first deletion process of, in response to determining that a first condition is satisfied, deleting the particular information stored in the memory, the first condition being that movement of the image forming apparatus is detected by the sensor.

BRIEF DESCRIPTION OF THE DRAWINGS

Embodiments in accordance with this disclosure will be described in detail with reference to the following figures wherein:

FIG. 4 is a flowchart for showing operations when the main power of the MFP shown in FIG. 1 is ON;

FIG. 9 is a flowchart for showing operations when a main power of the MFP according to the fourth embodiment is ON;

FIG. 11 is a flowchart for showing operations when a main power of the MFP according to the fifth embodiment is ON.

DETAILED DESCRIPTION

Confidential information that includes personal information on a user, for example, is stored in a memory of an image recording apparatus. In the above-described image recording apparatus, even after relocation of the image recording apparatus has been detected and the printing function has been locked, such confidential information may remain within the image recording apparatus. Therefore, there is a risk that the confidential information may leak from the relocated image recording apparatus to the outside.

In view of the foregoing, an example of an object of this disclosure is to provide an image recording apparatus that reduce the risk of confidential information that is stored inside the image recording apparatus leaking to the outside when the image recording apparatus has been relocated.

An MFP 1 (multifunction peripheral) according to a first embodiment will be described while referring to FIGS. 1 to 5.

Figure 1:
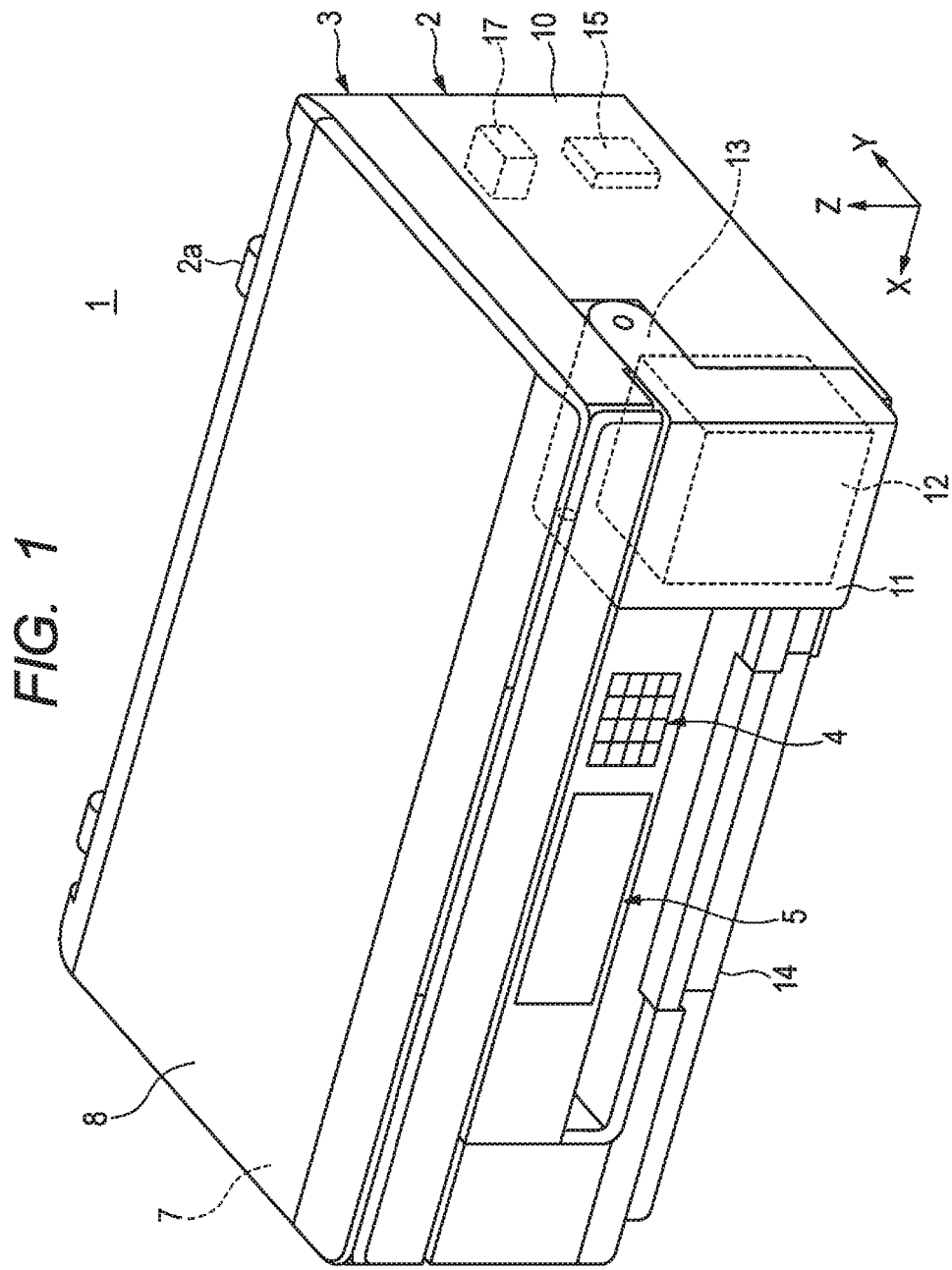
FIG. 1 is an external view for showing an MFP according to a first embodiment.

As shown in FIG. 1, the MFP 1 is an example of an image recording apparatus configured to record an image on a recording medium, and has an outer appearance that has a rectangular shape in which an X-direction is a width direction, a Y-direction is a front-rear (depth) direction, and a Z-direction is an upper-lower (vertical) direction. The MFP 1 includes a printer unit 2 (an example of a print engine), a scanner unit 3 (an example of an image forming device), operation keys 4, a display 5, an internal power source 15, a power receiving unit 17, and a controller 6 (see FIG. 2).

The scanner unit 3 reads an image by using an imaging element to generate image data. The generated image data is stored in the printer unit 2 of the MFP 1, or is printed on a recording sheet that is supplied from outside the MFP 1.

The scanner unit 3 is arranged on top of the printer unit 2, and is linked to the printer unit 2 through a linking portion 2a that is provided on a rear side portion of the printer unit 2. Therefore, when a front portion of the scanner unit 3 is lifted up, the scanner unit 3 pivotally moves up relative to the printer unit 2 with the linking portion 2a as a fulcrum to expose the inside of the printer unit 2.

In addition, the scanner unit 3 includes an original document platen 7 and a lid 8. The lid 8 is arranged so as to cover an upper part of the original document platen 7. The scanner unit 3 reads an image that is recorded on an original document sheet while the original document sheet is between the original document platen 7 and the lid 8.

The operation keys 4 and the display 5 are located on an outer side portion (front side portion in this embodiment) of the MFP 1. The operation keys 4 are each configured to receive input of a user operation. The display 5 displays particular information to the user. One part of the display 5 also functions as an operation key at a particular timing. The controller 6 controls the printer unit 2, the scanner unit 3, and the display 5 based on input through the operation keys 4, or external input through a communication interface 18.

The printer unit 2 records an image onto a recording sheet by using ink that is supplied from a tank 12. The printer unit 2 includes a case 10 that forms a part of a casing of the MFP 1. A cover 11 that is configured to open/close an opening portion that communicates with an internal space 13 in the case 10 is attached to the case 10. A tray 14 that stores the recording sheet is provided inside the case 10. The recording sheet is replenished by pulling out the tray 14 toward the front of the case 10.

The tank 12 in which the ink is stored is housed in the internal space 13. The tank 12 is exposed to the outside when the cover 11 is opened. The tank 12 is connected to a recording head 36 through an ink passage in a manner that allows ink to be supplied to the recording head 36.

The internal power source 15 is provided inside the case 10. The internal power source 15 enables the controller 6 and an acceleration sensor 16 described later to operate when the main power source of the MFP 1 is OFF. The internal power source 15 is a secondary (rechargeable) battery, as an example. The power receiving unit 17 is provided so as to be exposed to the outside from the case 10, and is configured to receive a supply of power from an external power source. When the main power source is ON, the MFP 1 supplies power from outside the MFP 1 to various parts within the MFP 1 through the power receiving unit 17. The internal power source 15 is charged by power that is supplied from outside the MFP 1 through the power receiving unit 17, irrespective of the state of the main power source.

[Functional Configuration of MFP]

Figure 2:
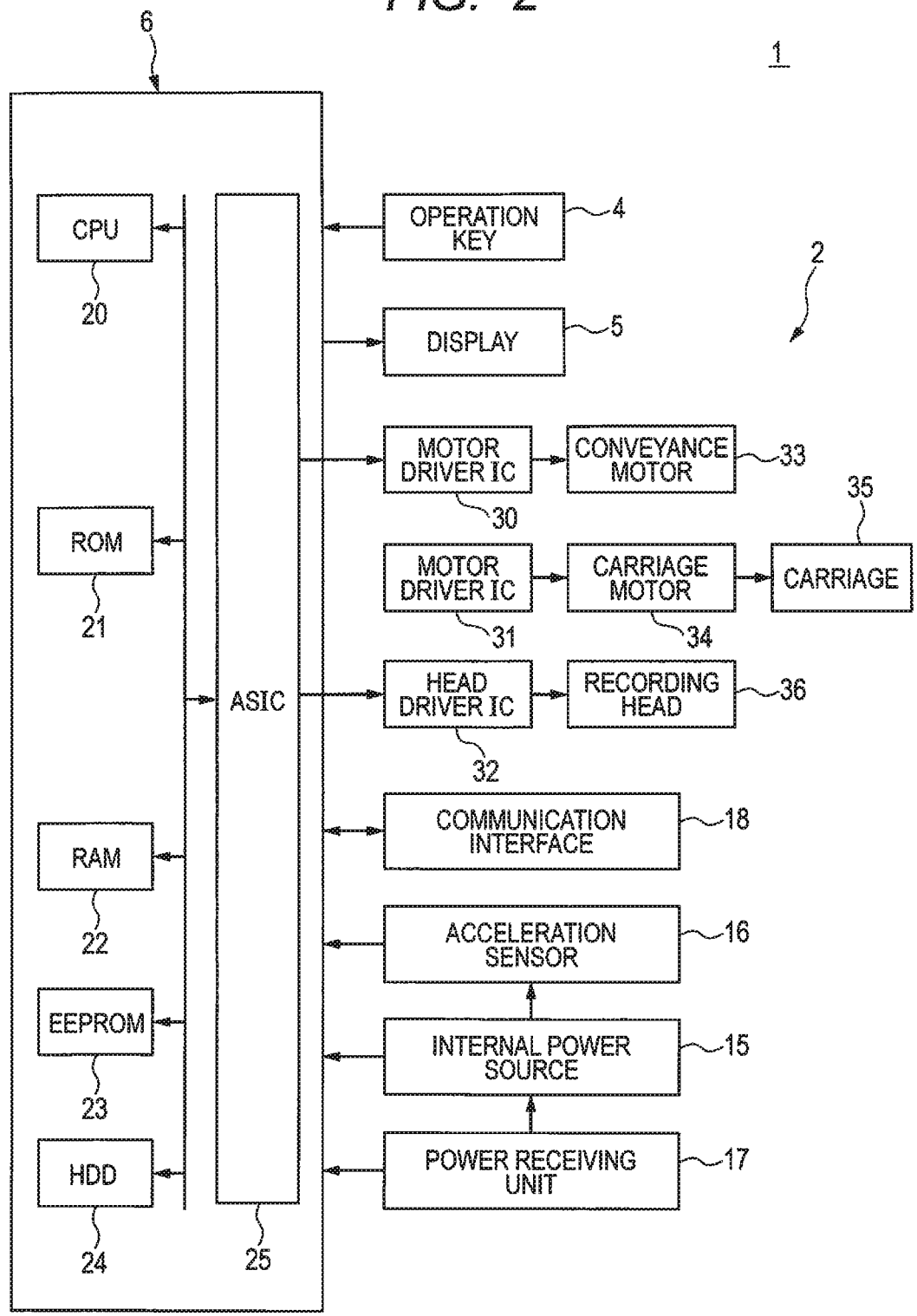
FIG. 2 is a functional block diagram for showing the MFP shown in FIG. 1.

As shown in FIG. 2, the MFP 1 includes the operation keys 4, the display 5, and the controller 6, as well as various elements that make up the printer unit 2. In FIG. 2, illustrations of configurations related to the scanner unit 3 are omitted.

More specifically, the printer unit 2 further includes the acceleration sensor 16, motor driver ICs 30, 31, a head driver IC 32, a conveyance motor 33, a carriage motor 34, a carriage 35, and the recording head 36.

The acceleration sensor 16 detects acceleration that acts on the MFP 1. A detection signal from the acceleration sensor 16 is sent to a CPU 20 of the controller 6 described later, and the controller 6 detects whether the MFP 1 has moved (whether the MFP 1 has been relocated). More specifically, the MFP 1 includes a movement detector that is configured to detect whether the MFP 1 has moved. This movement detector is configured of the acceleration sensor 16 and the controller 6. As an example, the acceleration sensor 16 is a vibration acceleration sensor 16, but the acceleration sensor 16 is not limited thereto.

For example, the controller 6 includes the CPU 20, memories (a ROM 21, a RAM 22, an EEPROM 23, and a HDD 24), and an ASIC 25. The CPU 20 is a controller of the MFP 1, and is configured to control the memories, the driver ICs 30 to 32, and the display 5.

The CPU 20 performs various functions by running a particular program that is stored in the ROM 21. For example, when the main power source of the MFP 1 is OFF, the CPU 20 monitors detection values of the acceleration sensor 16. The CPU 20 also functions as a timer that measures the time at which the acceleration sensor 16 outputs a detection value that is larger than or equal to a reference value.

When the main power source of the MFP 1 is ON, the CPU 20 performs a particular process based on detection values of the acceleration sensor 16, for example. The CPU 20 may be implemented as a single processor of the controller 6, or may be implemented as multiple processors that cooperate together.

The ROM 21 stores a read control program for causing the CPU 20 to perform a read process of an image on the original document sheet with the scanner unit 3, and a print control program for causing the CPU 20 to perform a print process with the printer unit 2.

The RAM 22 stores calculation results of the CPU 20. The EEPROM 23 stores various initialization information input by the user. The HDD 24 stores particular information, detection values of the acceleration sensor 16, data of the time at which the detection values are detected, and reference values for performing a particular determination regarding the detection values.

The particular information is highly confidential information that may cause problems if leaked to the outside. For example, the particular information includes information that relates to a user (user-related information), job data that is received by the MFP 1 from an external source and includes a user ID that identifies a transmission source, user usage history information that includes the user ID in the job data, secure job data that includes passwords and data on secure jobs, FAX transmission histories, printing histories, FAX data, and cloud setting data.

The information on a user includes, for example, telephone directory information, email address information, information on the administrator (security administrator) of the MFP 1, and network setting information. When the MFP 1 receives job data, the CPU 20 stores, in the HDD 24, the user usage history information that includes the user ID in the job data. The HDD 24 is merely a configuration example of the memory, and may be an SSD, for example. The RAM 22 may also have the storage function of the HDD 24.

The particular information and the user information do not need to include all of the above-mentioned types of information, and may be selected by the user.

The motor driver ICs 30, 31, and the head driver IC 32 are connected to the ASIC 25. When the CPU 20 receives a print job from the user, the CPU 20 outputs a print command to the ASIC 25 based on the print control program. The ASIC 25 drives the various driver ICs 30 to 32 based on the print command.

For example, the CPU 20 controls the motor driver IC 30 to drive the conveyance motor 33 to convey the recording sheet. The CPU 20 also controls the motor driver 31 to drive the carriage motor 34 to move the carriage 35.

The CPU 20 controls the head driver IC 32 to drive the recording head 36 mounted on the moving carriage 35 to eject ink, and prints image data onto the recording sheet that is fed, thereby performing the print process.

[Overall Operation of MFP]

Overall operation of the MFP 1 according to this embodiment is now described. In the MFP 1, when the CPU 20 receives power from an external power source through the power receiving unit 17, the CPU 20 shuts off power supply to the acceleration sensor 16 to put the acceleration sensor 16 in a detection-disabled state. When power from the external power source is shut off, and the CPU 20 receives power from the internal power source 15, the CPU 20 supplies power to the acceleration sensor 16 to put the acceleration sensor 16 in a detection-enabled state.

Alternatively, in the MFP 1, power may be supplied to the acceleration sensor 16 both when the CPU 20 receives power from an external power source through the power receiving unit 17, and when the CPU 20 receives power from the internal power source 15 since power from the external power source is shut off. In this case, when the CPU 20 receives power from an external power source through the power receiving unit 17, the CPU 20 does not receive an output signal from the acceleration sensor 16. When the CPU 20 receives power from the internal power source 15 since power from the external power source is shut off, the CPU 20 receives an output signal from the acceleration sensor 16. The MFP 1 may be configured to switch to either the detection-disabled state or the detection-enabled state by switching between these two modes.

In this embodiment, when the main power source of the MFP 1 is OFF, at least the acceleration sensor 16 and the controller 6 of MFP 1 operate by the internal power source 15. With this configuration, even when the main power source is OFF, the MFP 1 detects whether the MFP 1 has been relocated.

Figure 3:
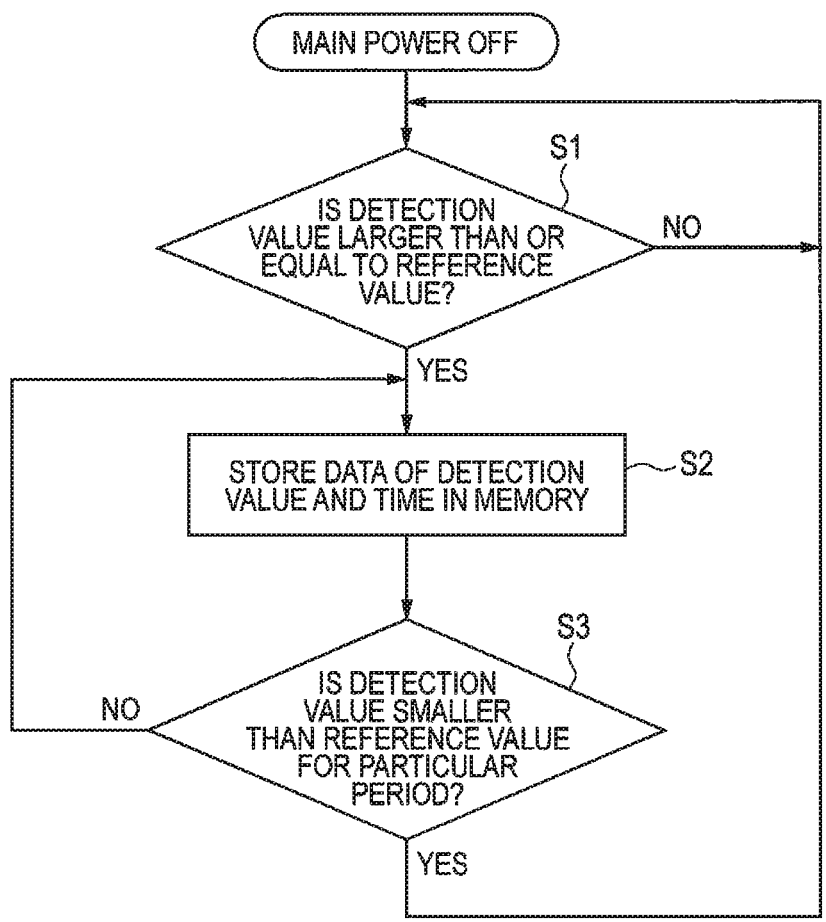
FIG. 3 is a flowchart for showing operations when a main power of the MFP shown in FIG. 1 is OFF.

As shown in FIG. 3, specifically, when the main power source of the MFP 1 is OFF, the CPU 20 determines whether a detection value of the acceleration sensor 16 is larger than or equal to a reference value (Step S1; hereinafter simply referred to as "S1". Other steps are similarly abbreviated). Here, the reference value is a detection value that is outputted from the acceleration sensor 16 when acceleration acts on the MFP 1 due to movement of the MFP 1. Therefore, the detection value of the acceleration sensor 16 being larger than or equal to the reference value indicates that the MFP 1 has moved.

In S1, if the CPU 20 determines that the detection value is larger than or equal to the reference value (S1: Yes), data of the detection value and the time at which that detection value is detected are stored in the memory (the HDD 24, for example) (S2). As a means of measuring the time, a real-time clock (RTC), for example, that is built into the MFP 1 may be used.

Next, the CPU 20 determines whether the detection value is smaller than the reference value for a particular period (S3). If the CPU 20 determines in S3 that the detection value is not smaller than the reference value for a particular period (S3: No), the processing returns to S2. When the detection value of the acceleration sensor 16 is smaller than the reference value for a particular period, there is a high chance that the MFP 1 has not been relocated. Therefore, if the CPU 20 determines in S3 that the detection value is smaller than the reference value for a particular period (S3: Yes), the processing returns to S1. Here, the particular period may be set as appropriate, and is set to a period within a range from tens of minutes to tens of hours, for example.

When a detection value that is larger than or equal to the reference value of the acceleration sensor 16 is detected by performing the above-described processing while the main power source of the MFP 1 is OFF, data of the detection value and the time at that time are stored in the memory. Therefore, when a detection value of the acceleration sensor 16 that is larger than or equal to the reference value is detected as a result of relocation of the MFP 1 when the main power source is OFF, data of the detection value and the time at the time of relocation are stored in the memory. As will be described below, the MFP 1 shifts to various modes based on the above processing that is performed when the main power source is OFF.

Figure 4:
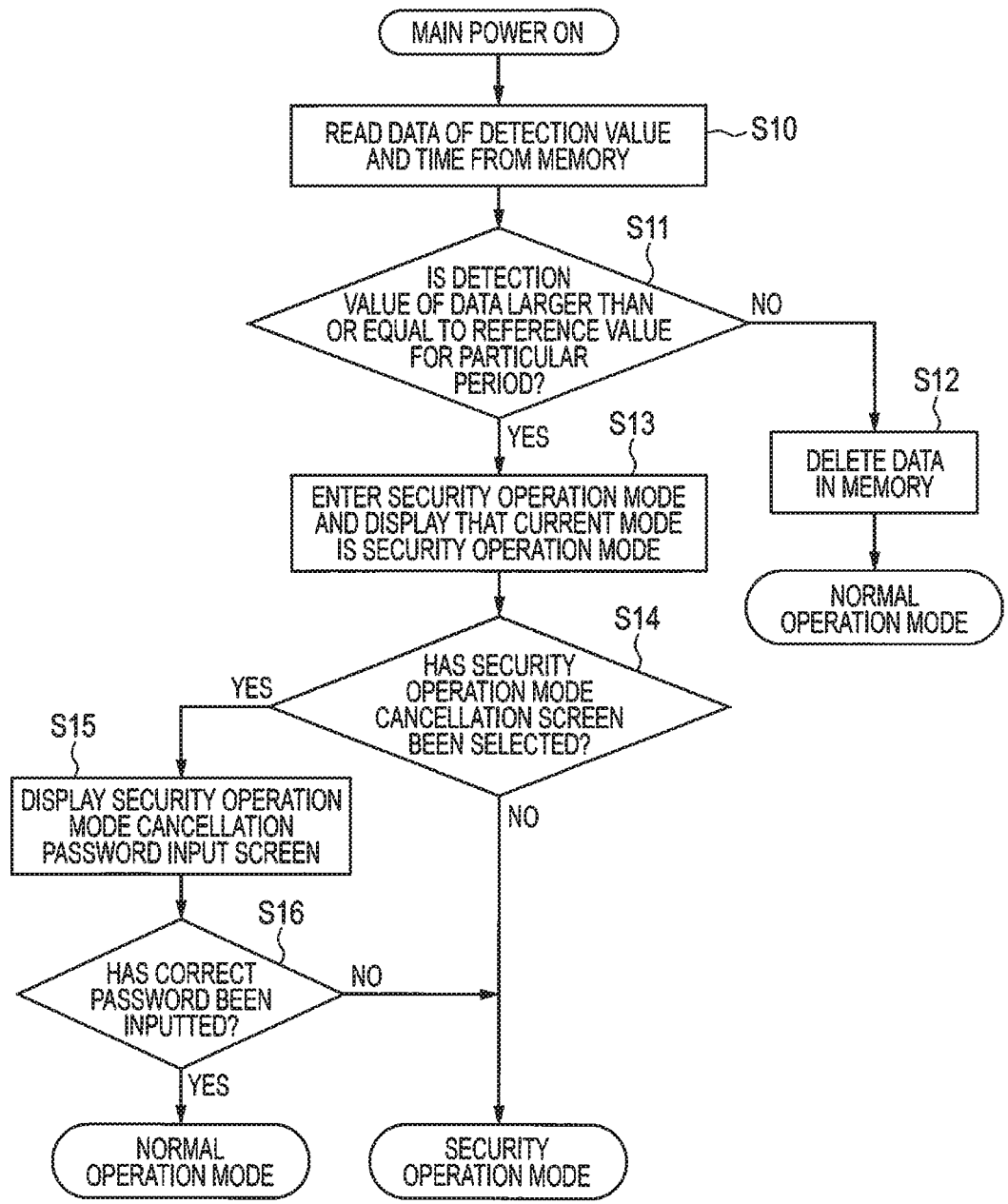

As shown in FIG. 4, when the main power source of the MFP 1 is ON, the CPU 20 reads data of the detection value and the time at which that detection value is detected from the memory (S10). Then, the CPU 20 determines whether the detection value in the data read from the memory is larger than or equal to the reference value for a particular period (S11).

In S11, if the CPU 20 determines that the detection value in the data read in S10 is not larger than or equal to the reference value for the particular period (S11: No), the CPU 20 deletes the data read in S10 from the memory (S12) because there is a high chance that the MFP 1 has not been relocated, and shifts the MFP 1 to a normal operation mode. The normal operation mode is a mode in which all of the functions of the MFP 1 can be used correctly.

In S11, if the CPU 20 determines that the detection value in the data read in S10 is larger than or equal to the reference value for the particular period (S11: Yes), because there is a high chance that the MFP 1 has been relocated, the CPU 20 shifts the MFP 1 to a security operation mode, displays, on the display 5, a message notifying that the current mode is the security operation mode, and displays a message "Select security operation mode cancellation screen" (S13), for example. As a result, the CPU 20 performs a receiving process of receiving input of a user operation after movement of the MFP 1 has been detected. The security operation mode is a mode of preventing confidential information stored in the MFP 1 from leaking due to relocation of the MFP 1, and causing the MFP 1 to perform a particular operation. The security operation mode is described later.

Next, the CPU 20 determines whether the security operation mode cancellation screen displayed on the display 5 has been selected by the user (S14). If the CPU 20 determines in S14 that the security operation mode cancellation screen has not been selected by the user (S14: No), the security operation mode continues. If the CPU 20 determines in S14 that the security operation mode cancellation screen has been selected (S14: Yes), the CPU 20 displays a password input screen for cancelling the security operation mode on the display 5 (S15).

Then, the CPU 20 determines whether the user has inputted the correct password on the password input screen displayed on the display 5 (S16). If the CPU 20 determines in S16 that the user has not inputted the correct password on the password input screen (S16: No), the security operation mode continues. If the CPU 20 determines in S16 that the user has inputted the correct password on the password input screen (S16: Yes), the CPU 20 shifts the MFP 1 to the normal operation mode. The password is preset by, for example, a user that is registered as an administrator of the MFP 1.

By performing the above-described processing, while the main power source of the MFP 1 is ON, when a detection value detected by the acceleration sensor 16 is found to be larger than or equal to the reference value for a particular period based on data stored in the memory, the MFP 1 is shifted to the security operation mode, and the security operation mode continues until the user inputs the correct password. With this configuration, as described later, the data that is stored in the MFP 1 before relocation is prevented from leaking to the outside after the MFP 1 is relocated.

Figure 5:
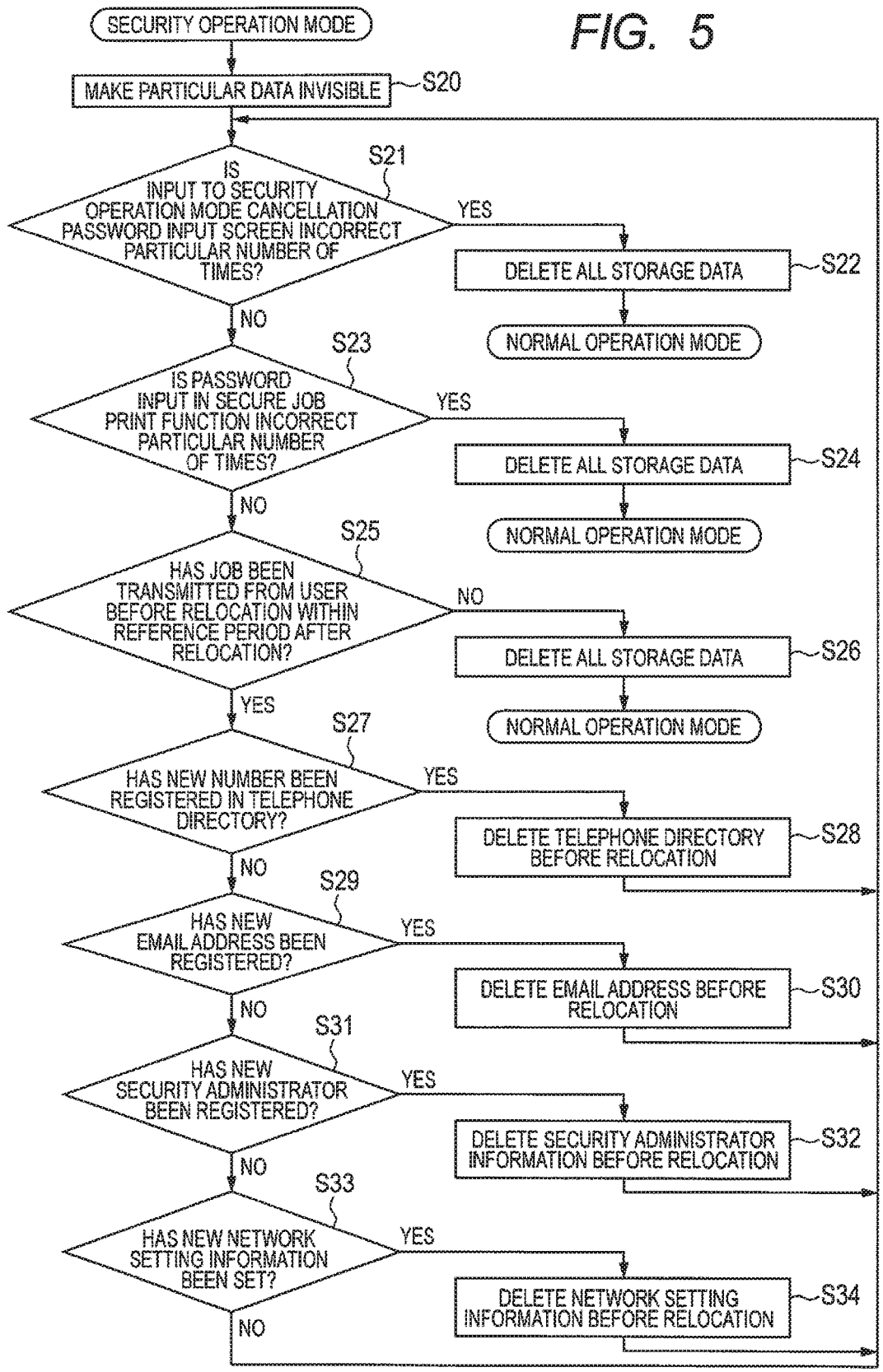
FIG. 5 is a flowchart for showing operations of the MFP shown in FIG. 1 during a security operation mode.

Here, a first condition is defined as that movement of the MFP 1 is detected by the acceleration sensor 16 during the security operation mode. As shown in FIG. 5, the CPU 20 performs a first deletion process of deleting the particular information stored in the memory when the first condition is satisfied.

As an example, the first deletion process according to this embodiment is a process of deleting all the particular information stored in the memory. When the first condition is satisfied, the CPU 20 selects either the first deletion process or second deletion process based on an input result of a user operation after movement of the MFP 1 is detected. The second deletion process is a process of keeping a part of the particular information (partial information) in the memory, and deleting the particular information that is other than the part.

Specifically, as shown in FIG. 5, the CPU 20 first makes particular data stored in the memory invisible (inaccessible) to the user (S20). In S20, the invisible data is especially highly confidential information among the particular information stored in the memory before the detection value is determined in S3 to be larger than or equal to the reference value for the particular period. The invisible data includes telephone directory information, email address information, FAX data, and so on. More specifically, even when the user operates the operation keys 4, the CPU 20 prohibits the particular data from being displayed on the display 5 and from being outputted through printing, for example. Cases in which the MFP 1 shifts to the security operation mode are not limited to a case where the MFP 1 has been relocated due to theft or illegal resale, and may include cases in which the MFP 1 has been relocated within a company or moved within an office, or has been relocated in a legal manner, such as through legal resale. Therefore, because the CPU 20 makes particularly confidential information undisplayable in S20, the confidential information stored in the MFP 1 is prevented from leaking to the outside in the case of illegal relocation, and convenience of the MFP 1 at the site of relocation is ensured to some degree in the case of legal relocation.

Next, the CPU 20 determines whether an incorrect password is inputted a particular number of times in the password input screen for cancelling the security operation mode (S21). In S21, if the CPU 20 determines that an incorrect password is inputted the particular number of times in the password input screen (S21: Yes), the CPU 20 determines that there is a high chance that the relocation of the MFP 1 is an illegal relocation, such as theft or illegal resale, performs the first deletion process by deleting all storage data stored in the memory (S22), and shifts the MFP 1 to the normal operation mode.

A second condition is defined as that an input of an operation in the receiving process is an incorrect input. As described above, in this embodiment, the CPU 20 performs the first deletion process when at least the second condition in addition to the first condition is satisfied. The storage data to be deleted in the first deletion process includes at least the particular information that is stored in the memory before the detection value is determined in S3 to be larger than or equal to the reference value for the particular period.

In S21, if the CPU 20 determines that an incorrect password is not inputted the particular number of times in the password input screen (S21: No), the CPU 20 then determines whether an incorrect password is inputted a particular number of times in a secure job print function (S23). In S23, if the CPU 20 determines that an incorrect password is inputted the particular number of times in the secure job print function (S23: Yes), similarly to S22, the CPU 20 determines that there is a high chance that the relocation of the MFP 1 is an illegal relocation, performs the first deletion process by deleting all the storage data (S24), and shifts the MFP 1 to the normal operation mode.

In this embodiment, the CPU 20 permits execution of a secure job on condition that the correct password included in secure job data stored in the memory has been inputted. A fifth condition is defined as that a correct password is not inputted when executing a secure print job after movement has been detected. However, as described above, the CPU 20 performs the first deletion process when at least the fifth condition in addition to the first condition is satisfied (S23: Yes) (S24).

In S23, if the CPU 20 determines that an incorrect password is not inputted the particular number of times in the secure job print function, that is, the correct password is inputted within the particular number of times, (S23: No), the CPU 20 then determines whether a job has been transmitted from the user before relocation (before the detection value is determined in S3 to be larger than or equal to the reference value for a particular period) is within a reference period after relocation (S25). Here, the CPU 20 determines whether job data received by the MFP 1 belongs to the user before relocation, by determining whether a user ID included in the job data received by the MFP 1 is included in the user usage history information stored in the memory before detection of movement. In S25, if no job is transmitted from the user before relocation within the reference period after relocation (S25: No), similarly to S22, the CPU 20 determines that there is a high chance that the relocation of the MFP 1 is an illegal relocation, performs the first deletion process by deleting all the storage data (S26), and shifts the MFP 1 to the normal operation mode.

The reference period may be set as appropriate. For example, the reference period may be set to a period within a range from tens of seconds to tens of hours, from the time the acceleration sensor 16 completes detection of the detection value referenced in S12 when the MFP 1 is shifted to the security operation mode in S13, among the data stored in the memory in S2.

In S25, if the CPU 20 determines that the job has been transmitted from the user before relocation within the reference period after relocation (S25: Yes), the CPU 20 then determines whether a telephone number is newly registered in the telephone directory after relocation (S27). If the CPU 20 determines in S27 that a telephone number is newly registered in the telephone directory after relocation (S27: Yes), the CPU 20 performs the second deletion process by deleting the telephone directory information stored before the relocation (S28), and returns the processing to S21.

In S27, if the CPU 20 determines that no telephone number is newly registered in the telephone directory after relocation (S27: N), the CPU 20 then determines whether an email address is newly registered after the relocation (S29). If the CPU 20 determines in S29 that an email address is newly registered after the relocation (S29: Yes), the CPU 20 performs the second deletion process by deleting the email address information stored before the relocation (S30), and returns the processing to S21.

In S29, if the CPU 20 determines that no email address is newly registered after the relocation (S29: N), the CPU 20 then determines whether a security administrator of the MFP 1 is newly registered after the relocation (S31). If the CPU 20 determines in S31 that a security administrator is newly registered after the relocation (S31: Yes), the CPU 20 performs the second deletion process by deleting the security administrator data stored before the relocation (S32), and returns the processing to S21.

In S31, if the CPU 20 determines that no security administrator is newly registered after the relocation (S31: N), the CPU 20 then determines whether network setting information is newly registered after the relocation (S33). If the CPU 20 determines in S33 that network setting information is newly registered after the relocation (S33: Yes), the CPU 20 performs the second deletion process by deleting the network setting data stored before the relocation (S34), and returns the processing to S21. In S33, if the CPU 20 determines that no network setting information is newly registered after the relocation (S33: N), the processing returns to S21.

As described above, in the security operation mode, after the MFP 1 has been relocated, all of the storage data including the identification data is deleted (S22, S24, S26) if there is a high chance that the relocation is an illegal relocation. Therefore, the confidential information stored before the relocation is prevented from leaking. In addition, if the particular information such as the telephone directory information, the email address information, the security administrator information, and the network setting information is newly registered to the MFP 1 after the MFP 1 has been relocated, the confidential information stored before the relocation is deleted, thereby preventing the confidential information stored before relocation from leaking to the outside.

As an example, in the second deletion process performed in S28, S30, S32, and S34, the CPU 20 of this embodiment keeps job data stored in the memory before movement of the MFP 1 is detected. For example, if job data is deleted from the memory when the relocation of the MFP 1 is a legal relocation, the user may feel inconvenience. The above-mentioned configuration prevents such inconvenience.

In the second deletion process, it is not necessary to keep job data in the memory. That is, job data may be deleted in the second deletion process, thereby preventing the confidential information in the job data from leaking to the outside.

As described above, according to the MFP 1, the CPU 20 performs the first deletion process when the first condition is satisfied, thereby deleting the particular information stored in the memory. Therefore, the risk of the particular information stored in the MFP 1 leaking to the outside can be reduced.

The first deletion process is a process of deleting all the particular information stored in the memory. When the first condition is satisfied, the CPU 20 selects and performs either the first deletion process or the second deletion process based on an input result of a user operation after movement of the MFP 1 is detected (S22, S24, S26, S28, S30, S32, S34). Therefore, when the first condition is satisfied, for example, if an incorrect password is inputted in the security operation mode cancellation password input screen or in the secure job print function, the CPU 20 deletes the particular information stored in the memory by performing the first deletion process based on the result of the operation input. Therefore, the particular information stored in the MFP 1 can be appropriately prevented from leaking to the outside and being used illegally.

Even in a case where the first deletion process is not performed when the first condition is satisfied, the CPU 20 performs the second deletion process (S28, S30, S32, S34) based on the result of the operation input. In the second deletion process, the CPU 20 keeps a part of the particular information (in this embodiment, job data) in the memory, and deletes the particular information that is other than that part.

Therefore, the particular information to be deleted in the second deletion process is set to highly confidential information, for example. This ensures convenience of the MFP 1 to some degree at the relocation destination when the relocation is a legal relocation performed by the user, and appropriately prevents the confidential information stored in the MFP 1 from leaking to the outside when the relocation is an illegal relocation.

When particular target information in the particular information is updated after movement is detected, in the second deletion process, the CPU 20 deletes the target information stored in the memory before movement is detected (S28, S30, S32, S34). With this configuration, for example, in a case where relocation of the MFP 1 is thought to be either a legal relocation performed by the user or an illegal relocation, the target information is deleted from the memory, thereby preventing the target information before update from leaking to the outside.

In the second deletion process, at least the information on the user among the particular information is deleted (S28, S30, S32, S34), and therefore the information on the user is appropriately prevented from leaking to the outside at the relocation destination.

The job data is included in the particular information. Thus, even when highly confidential information is included in the job data, the confidential information in the job data is appropriately prevented from leaking to the outside by performing at least the first deletion process (S22, S24).

The memory stores the secure job data including the passwords and the data on the secure job. The CPU 20 permits execution of the secure job on condition that the password included in the secure job data stored in the memory is correctly inputted. The fifth condition is defined as that the correct password is not inputted when executing a secure job after movement is detected. When at least the fifth condition in addition to the first condition is satisfied (S23: Yes), the CPU 20 performs the first deletion process (S24).

As described above, by controlling the timing at which the first deletion process is performed, no burden is placed on the user who knows the password, and the highly confidential information in the secure job can be appropriately prevented from leaking to the outside.

The target information is at least any one of the security administrator information of the MFP 1, the telephone directory information, the email address information, and the network setting information. Therefore, confidential information such as important personal information on the user can be prevented from leaking to the outside.

The second condition is defined as that an input of an operation in the receiving process is an incorrect input, and a third condition is defined as that no operation input is performed in the receiving process (S14: N). The CPU 20 performs the first deletion process when at least the second condition in addition to the first condition is satisfied (S22). The CPU 20 performs either one of the first deletion process and the second deletion process when at least the third condition in addition to the first condition is satisfied (S24, S26, S28, S30, S32, S34).

With this configuration, for example, the first deletion process is performed when there is a high chance that the relocation of the MFP 1 is not the legal relocation, and the second deletion process is performed when there is a high chance that the relocation is a legal relocation. Therefore, the particular information in the MFP 1 is appropriately prevented from leaking to the outside. Next, another embodiment of this disclosure is described, focusing on differences from the first embodiment.

Second Embodiment

Figure 6:
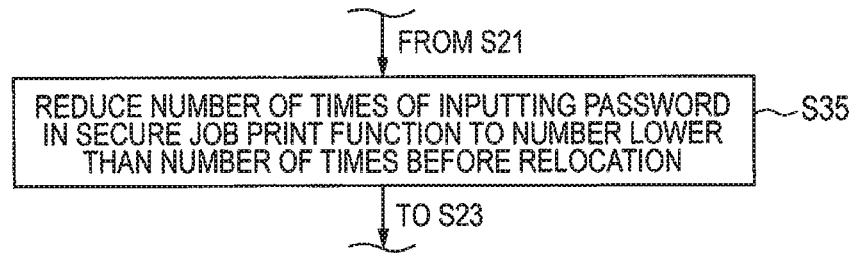
FIG. 6 is a flowchart for showing operations of an MFP according to a second embodiment during a security operation mode.

In a second embodiment shown in FIG. 6, between S21 and S23 shown in FIG. 5, the CPU 20 performs processing of reducing the number of times of password input in the secure job print function to a number lower than the number before relocation of the MFP (S35).

That is, on condition that the correct password is inputted in the password input screen within the particular number of times (S21: N), the CPU 20 reduces the number of times of inputting password in the secure job print function to a number lower than the number of times before movement is detected (S35). And, on condition that the correct password has been inputted within the particular number of times when executing the secure job (S23: N), the CPU 20 permits the execution of the secure job. Therefore, the confidential information included in the secure job is more appropriately prevented from leaking to the outside.

In the second embodiment, the particular number of times before movement is detected is unlimited (no limit), and the particular number of times after movement is detected is one. In other words, after movement is detected, the first deletion process is performed (S23, S24) when an incorrect password is inputted even once during execution of the secure job.

This configuration prevents a legal user from feeling inconvenience in order to prevent the information in the secure job from leaking to the outside, and reliably reduces the risk of the confidential information in the MFP leaking to the outside by an illegal user.

Third Embodiment

Figure 7:
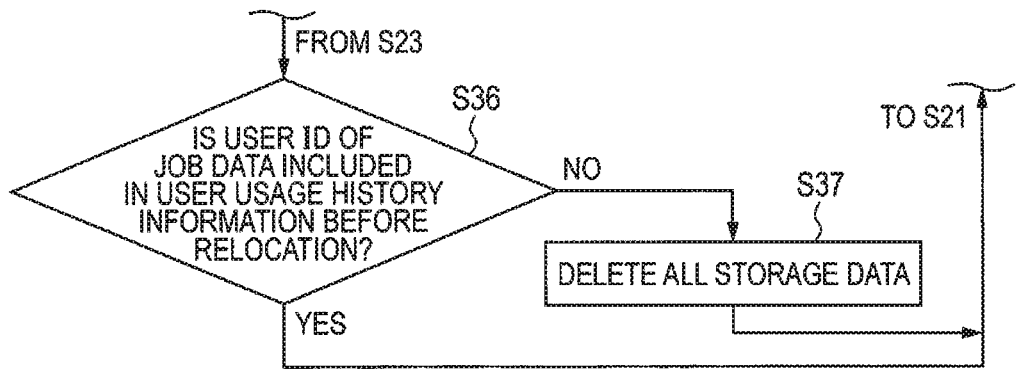
FIG. 7 is a flowchart for showing operations of an MFP according to a third embodiment during a security operation mode.

In the third embodiment shown in FIG. 7, when the MFP 1 receives job data, the CPU 20 stores user usage history information including the user ID in the job data in the memory.

A fourth condition is defined as that, after movement is detected (S1), the user ID in the job data received by the MFP 1 is not included in the user usage history information stored in the memory before movement is detected. The CPU 20 performs the first deletion process when at least the fourth condition in addition to the first condition is satisfied.

More specifically, after S23 in FIG. 5 is performed, instead of S25, as shown in FIG. 7, the CPU 20 determines whether the user ID in the job data received by the MFP 1 is included in the user usage history information stored in the memory before movement is detected (S36).

In S36, if the CPU 20 determines that the user ID included in the job data is not included in the user usage history information stored in the memory before movement is detected (S36: N), instead of S26, the CPU 20 performs the first deletion process by deleting the storage data (S37), and returns the processing to S21. In S36, if the CPU 20 determines that the user ID included in the job data is included in the user usage history information stored in the memory before movement is detected (S36: Yes), and the processing returns to S21.

As described above, by controlling the timing at which the CPU 20 performs the first deletion process, for example, the job data is appropriately prevented from being deleted regardless of whether the user has legally relocated the MFP 1. And the information including the job data is prevented from leaking from the MFP 1 to the outside when there is a risk that the MFP 1 is used by a user different from the user before the relocation.

Note that the processing may proceed to S27 in FIG. 5 if the CPU 20 determines that the user ID in the job data is included in the user usage history information stored in the memory before movement is detected (S36: Yes).

Fourth Embodiment

The MFP 1 according to the fourth embodiment includes a GSP sensor in place of the acceleration sensor 16. In the fourth embodiment, when the main power source of the MFP 1 is OFF, at least the GPS sensor and the CPU 20 of the MFP 1 are operated by the internal power source 15. After the user has installed the MFP 1, current positional information of the MFP 1 is stored in the memory.

Figure 8:
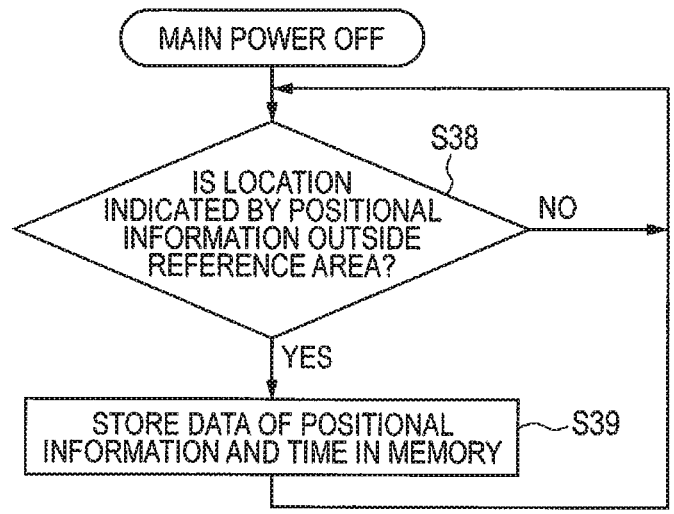
FIG. 8 is a flowchart for showing operations when a main power source of the MFP according to a fourth embodiment is OFF.

As shown in FIG. 8, when the main power source of the MFP 1 is OFF, the CPU 20 determines whether a location indicated by positional information of the detection value of the GPS sensor is outside a reference area (S38). The reference area is, for example, an area within a particular range from the location indicated by the positional information stored in the memory when the user installs the MFP.

In S38, if the CPU 20 determines that the location indicated by the positional information of the detection value of the GPS sensor is outside the reference area (S38: Yes), the CPU 20 stores, in the memory, data of the positional information and the time at which the detection value indicating the positional information is detected (S39). If the CPU 20 determines that the location indicated by the positional information of the detection value of the GPS sensor is not outside the reference area (S38: N), the processing returns to S38.

Figure 9:
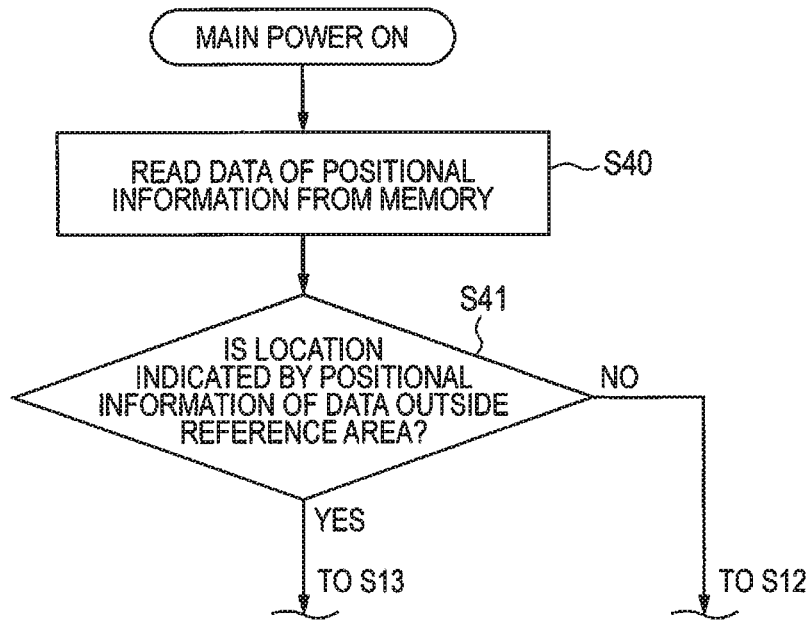

As shown in FIG. 9, when the main power source of the MFP 1 is ON, the CPU 20 reads positional information on the most recent time from the memory (S40) to determine whether the location indicated by the positional information in the data is outside the reference area (S41). Note that S40 in FIG. 9 is a step that corresponds to S10 in FIG. 4, and S41 in FIG. 9 is a step that corresponds to S11 in FIG. 4.

In S41, if the CPU 20 determines that the location indicated by the positional information of the data is not outside the reference area (S41: N), the processing proceeds to S12. If the CPU 20 determines that the location indicated by the positional information of the data is outside the reference area (S41: Yes), the processing proceeds to S13. Similar effects to those of the first embodiment can also be achieved with the above-mentioned processing.

As described above, the movement detector may be configured as a combination of the acceleration sensor 16 and the CPU 20, and may be configured as a combination of the GPS sensor and the CPU 20.

Fifth Embodiment

Figure 10:
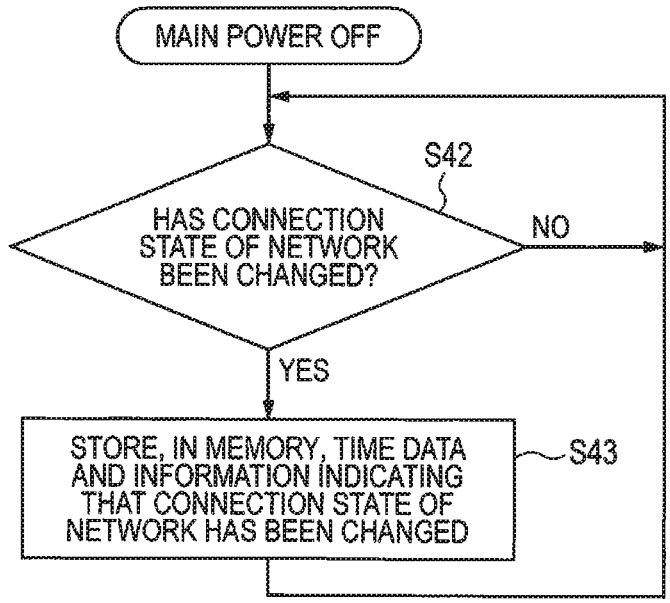
FIG. 10 is a flowchart for showing operations when a main power of the MFP according to a fifth embodiment is OFF.

As shown in FIG. 10, when the main power source of the MFP 1 is OFF, the CPU 20 determines whether a connection state of a network connected to the MFP 1 has changed (S42). In S42, if the CPU 20 determines that the connection state of the network has changed (S42: Yes), the CPU 20 stores, in the memory, information indicating that the connection state of the network has changed, and data on the time at which the connection state of the network changes (S43).

Examples of the connection state of the network include a connection state of a network to a DNS server or a gateway, and a connection state to a telephone network. The change in the connection state of the network may be, for example, that the network connection is disconnected.

As shown in FIG. 11, when the main power source of the MFP 1 is ON, the CPU 20 reads, from the memory, the most recent information indicating that the connection state of the network has changed and time data (S44), and determines whether the connection state of the network is in a reference state (S45). The reference state may be, for example, a state in which a period of the change in the connection state of the network is within a particular determination period. For example, if a LAN cable is pulled out of a LAN interface (an example of the communication interface 19) of the MFP 1 and, immediately after that, is again connected to the LAN interface, the period of the change in the connection state of the network is within the particular determination period. Note that S44 in FIG. 11 is a step that corresponds to S10 in FIG. 4, and S45 in FIG. 11 is a step that corresponds to S11 in FIG. 4.

In S45, if the CPU 20 determines that the connection state of the network read from the memory is not in the reference state (S45: N), the processing proceeds to S13. If the CPU 20 determines that the connection state of the network read from the memory is in the reference state (S45: Yes), the processing proceeds to S12. Similar effects to those of the first embodiment can also be achieved with the above-mentioned processing.

While the disclosure has been described in detail with reference to the above aspects thereof, it would be apparent to those skilled in the art that various changes and modifications may be made therein without departing from the scope of the claims.

For example, the acceleration sensor 16 is not limited to detecting the acceleration of the MFP 1, and may detect inclination of the MFP 1. In this case, the reference value may be set to a particular angle of the MFP 1. In this case, it can be estimated that the MFP 1 has moved when the MFP 1 is inclined by an angle larger than or equal to the reference value.

The image recording apparatus according to this disclosure is not limited to an MFP, and may be applied to various apparatuses that have an image recording function. This disclosure can also be applied to an image forming apparatus that reads and forms an image, such as a scanner.

What is claimed is:

1. An image recording apparatus comprising:
a print engine configured to record an image on a recording medium;
a sensor configured to detect whether the image recording apparatus is moved;
a controller; and
a memory configured to store particular information, the memory storing instructions, the instructions, when executed by the controller, causing the controller to perform:
a first deletion process of, in response to determining that a first condition is satisfied, deleting the particular information stored in the memory, the first condition being that movement of the image recording apparatus is detected by the sensor,
wherein the particular information includes job data;
wherein the memory stores secure job data including a password and data relating to a secure job; and
wherein the controller is configured to:
permit execution of the secure job in response to determining that the password included in the secure job data stored in the memory is inputted correctly; and
perform the first deletion process in response to determining that the first condition and a second condition are satisfied, the second condition being that no correct password is inputted for executing the secure job after detecting the movement.

2. The image recording apparatus according to claim 1, wherein, in the first deletion process, the controller is configured to delete all of the particular information stored in the memory; and
wherein, in response to determining that the first condition is satisfied, depending on a result of an operation input by a user after detecting the movement, the controller is configured to selectively perform one of:
the first deletion process; and
a second deletion process of keeping, in the memory, partial information that is a part of the particular information and deleting the particular information other than the partial information.

3. The image recording apparatus according to claim 2, wherein the controller is configured to, in the second deletion process, delete user-related information, the user-related information being the particular information that relates to a user.

4. The image recording apparatus according to claim 2, wherein, in response to determining that target information included in the particular information is updated after detecting the movement, the controller is configured to, in the second deletion process, delete the target information that is stored in the memory before detecting the movement.

5. The image recording apparatus according to claim 4, wherein the target information includes at least one of administrator information of the image recording apparatus, security administrator information of the image recording apparatus, telephone directory information, Email address information, and network setting information.

6. The image recording apparatus according to claim 2, wherein the controller is configured to further perform a receiving process of receiving an operation input by a user after detecting the movement; and
wherein the controller is configured to:
perform the first deletion process in response to determining that the first condition and a third condition are satisfied, the third condition being that the operation input in the receiving process is an incorrect input; and
perform one of the first deletion process and the second deletion process in response to determining that the first condition and a fourth condition are satisfied, the fourth condition being that no operation input is received in the receiving process.

7. The image recording apparatus according to claim 2, wherein the particular information includes job data; and
wherein, in the second deletion process, the controller is configured to keep, in the memory, the job data stored in the memory before detecting the movement.

8. The image recording apparatus according to claim 1, wherein the job data includes a user ID that identifies a transmission source of the job data;
wherein, when the image recording apparatus receives the job data, the controller is configured to store, in the memory, user usage history information including the user ID in the job data; and
wherein the controller is configured to perform the first deletion process in response to determining that the first condition and a third condition are satisfied, the third condition being that the user ID in the job data received by the image recording apparatus after detecting the movement is not included in the user usage history information stored in the memory before detecting the movement.

9. The image recording apparatus according to claim 1, wherein the controller is configured to:
reduce a particular number of times of inputting a password for executing the secure job to a number that is smaller than the particular number of times before detecting the movement; and
in response to determining that a correct password is inputted within the particular number of times that is reduced, permit execution of the secure job.

10. The image recording apparatus according to claim 9, wherein the particular number of times before detecting the movement is unlimited, and the particular number of times after detecting the movement is one.

11. The image recording apparatus according to claim 1, further comprising:
a power receiving unit configured to receive power from an external power source; and
an internal power source,
wherein the controller is configured to:
when power is received from the external power source through the power receiving unit, disable detection of the sensor; and
when power from the external power source is cut off and power is received from the internal power source, enable detection of the sensor.

12. The image recording apparatus according to claim 11, wherein the sensor comprises an acceleration sensor; and
wherein the controller is configured to:
when power is received from the external power source through the power receiving unit, cut off power to the acceleration sensor to disable detection of the sensor; and
when power from the external power source is cut off and power is received from the internal power source, supply the acceleration sensor with power to enable detection of the sensor.

13. The image recording apparatus according to claim 11, wherein the sensor comprises an acceleration sensor; and
wherein the controller is configured to:
when power is received from the external power source through the power receiving unit, not receive an output signal from the acceleration sensor to disable detection of the sensor; and
when power from the external power source is cut off and power is received from the internal power source, receive the output signal from the acceleration sensor to enable detection of the sensor.

14. The image recording apparatus according to claim 1, wherein the sensor comprises an acceleration sensor; and
wherein the controller is configured to:
in response to determining that a detection value detected by the acceleration sensor is larger than or equal to a reference value, store, in the memory, the detection value and time data at which the detection value is detected; and
in response to determining that the detection value is larger than or equal to the reference value for a particular period, determine that the first condition is satisfied.

15. The image recording apparatus according to claim 1, wherein the sensor comprises a GPS sensor; and
wherein the controller is configured to:
in response to determining that a location indicated by positional information of a detection value detected by the GPS sensor is outside a reference area, store, in the memory, the positional information and time data at which the positional information is detected, the reference area being an area within a particular range from a location indicated by positional information stored in the memory when the image recording apparatus is installed; and
in response to determining that the location indicated by the positional information is outside the reference area, determine that the first condition is satisfied.

16. An image recording apparatus comprising:
a print engine configured to record an image on a recording medium;
a sensor configured to detect whether the image recording apparatus is moved;
a controller; and
a memory configured to store particular information, the memory storing instructions, the instructions, when executed by the controller, causing the controller to perform:
a first deletion process of, in response to determining that a first condition is satisfied, deleting the particular information stored in the memory, the first condition being that movement of the image recording apparatus is detected by the sensor,
wherein, in the first deletion process, the controller is configured to delete all of the particular information stored in the memory;
wherein, in response to determining that the first condition is satisfied, depending on a result of an operation input by a user after detecting the movement, the controller is configured to selectively perform one of: the first deletion process; and
a second deletion process of keeping, in the memory, partial information that is a part of the particular information and deleting the particular information other than the partial information;
wherein the particular information includes job data; and
wherein the controller is configured to perform the first deletion process in response to determining that a user having transmitted the job data before detecting the movement does not transmit new job data within a reference period after detecting the movement.

17. An image recording apparatus comprising:
a print engine configured to record an image on a recording medium;
a communication interface configured to be connected to a communication network;
a controller; and
a memory configured to store particular information, the memory storing instructions, the instructions, when executed by the controller, causing the controller to perform:
in response to detecting a change of a connection state of the communication interface to the communication network, storing, in the memory, information indicating that the connection state of the network changes and time data at which the connection state of the network changes; and in response to determining that a continuation period of change of the connection state of the communication network exceeds a particular determination period, deleting the particular information stored in the memory.

* * * * *